United States Patent [19]

Gordy et al.

[11] 4,317,204
[45] Feb. 23, 1982

[54] SPREAD SPECTRUM CONFERENCING COMMUNICATION SYSTEM

[75] Inventors: Robert S. Gordy, Largo; David E. Sanders, St. Petersburg; Ramon P. Chambers, Clearwater, all of Fla.

[73] Assignee: NCR Corporation, Dayton, Ohio

[21] Appl. No.: 693,036

[22] Filed: Jun. 4, 1976

[51] Int. Cl.³ .............................................. H04B 1/10
[52] U.S. Cl. ......................................... 375/1; 370/18
[58] Field of Search ................. 325/65, 473, 474, 303, 325/304, 323, 435; 179/15 AQ, 41 A, 41 R; 375/1; 370/18, 107

[56] References Cited

U.S. PATENT DOCUMENTS

| | | | |
|---|---|---|---|
| 3,350,644 | 10/1967 | McNair | 325/65 |
| 3,403,341 | 9/1968 | Munch | 325/65 |
| 3,665,472 | 5/1972 | Kartchner et al. | 325/65 |
| 3,864,635 | 2/1975 | Ewanus | 325/65 |
| 3,916,313 | 10/1975 | Lowry | 325/65 |
| 4,017,798 | 4/1977 | Gordy et al. | 325/65 |
| 4,134,071 | 1/1979 | Ohnsorge | 375/1 |

*Primary Examiner*—Howard A. Birmiel
*Attorney, Agent, or Firm*—J. T. Cavender; Wilbert Hawk, Jr.; Jeffrey P. Morris

[57] ABSTRACT

An anti-jam PN sequence spread spectrum conferencing communication system is disclosed for simultaneously transmitting and receiving in a plurality of communications channels secure voice communications. All received messages are modulated with the same pseudo noise sequence and arrive at any given channel at random time states, wherein the messages are separated, separately processed and finally conferenced, using a technique based upon the correlation of the PN sequence and dependent upon the randomness of the epoch state of a given PN sequence coded with a message in relation to the other coded messages.

15 Claims, 7 Drawing Figures

SPREAD SPECTRUM CONFERENCING COMMUNICATION SYSTEM

BACKGROUND OF THE INVENTION

1. Field of the Invention

The invention relates generally to spread spectrum conferencing communication systems for providing an anti-jam voice communication system with a conferencing capability, and more particularly to a multiple channel system for receiving and demodulating two or more spread spectrum messages simultaneously. The invention also relates to a PSK communication system wherein a PN sequence is utilized as the spreading sequence and wherein the presence of each incoming message is detected by means of a digital transversal correlator.

2. Description of the Prior Art

Spread spectrum communication techniques are assuming greater significance as a means for providing secure communications. While a number of systems of the prior art relate to spread spectrum communications, such prior art systems do not provide a conferencing capability, i.e., the simultaneous decoding of two or more messages in a spread spectrum environment. The combination of an anti-jam (AJ) transmission and conferencing is of particular significance to a typical aircraft squadron in a tactical environment wherein two to six voice conversations may be required at any given time. This scenario provides a large number of potential users and an inherent randomness of calls, which would serve to eliminate an addressable system approach. The present invention utilizes a single PN sequence (either linear or nonlinear) which is generated by each system user modulator. Each participating user demodulator locks to a given message and provides a voice output. Incoming messages are identified, assigned a particular time slot, and assigned to a particular channel only. The channels are then combined at the audio level to provide a conferenced message. The invention is particularly advantageous in connection with a digital PSK (phase shift keyed) receiver. PSK transmission per se is well known and consists of the biphase modulation of a subcarrier frequency with digital data (zeros and ones) and transmission of a carrier phase modulated by such signal to a receiver where either coherent or non-coherent detection is employed to retrieve the subcarrier. Synchronization is achieved for proper demodulation in coherent PSK systems by use of a unique code having correlation properties suitable for providing this demodulation reference. One such well known code is the pseudonoise (PN code), a pseudorandom binary sequence. A number of references to this technique are provided by U.S. Pat. Nos. 3,402,265 and 3,305,636. U.S. Pat. No. 3,351,859 discloses a communications system wherein quasi-random noise modulation is used to distinguish identical signals successively received, i.e., identical PN sequences are received at different times or phases. U.S. Pat No. 3,432,619 discloses the assignment of a special PN sequence or part thereof to each system subscriber, but does not provide for conferencing the subscribers. U.S. Pat. No. 3,475,558 discloses a time gated PN multiplexing system for selection of one subscriber over another. Spread spectrum systems employ a bandwidth much greater than the information or data bandwidth, using a PN code independent of the data, but uniquely representative of the transmitter. At the receiver, all signals having a modulation format different from the transmitted format are discriminated against, since the correlation at the receiver provides a processing gain, i.e., an improved signal to noise ratio proportional to the ratio of signal bandwidth to data bandwidth.

SUMMARY OF THE INVENTION

The present invention relates to a spread spectrum conferencing system and receiver for receiving and demodulating a plurality of incoming messages simultaneously in a plurality of channels by employing a digital correlation technique to identify incoming messages, a time slot generation and multiplexing scheme for assigning a particular time slot to each of such messages, and a message selection and priority determination logic for preventing more than a single channel from receiving a particular message, while enabling a multiple channel conferencing capability at the audio level.

The specific modulation employed may comprise spread spectrum PSK, AM-PSK or other suitable encoding, while the PN sequence may be either a short repeating code or a long non-repeating code.

It is therefore an object of the invention to provide an anti-jam voice communication system with a conferencing capability.

It is another object of the invention to provide a spread spectrum conferenced communication system in which a PN sequence generated by each system user modulator may be locked to by each user demodulator to provide a voice output with a conferencing capability.

A further object of the invention is to provide a spread spectrum receiver for receiving messages at random intervals having PN spreading sequences, for separating and separately processing the messages, then recombining them at the analog voice band.

The foregoing and other objects and advantages of the present invention will become apparent with reference to the following detailed description thereof in conjunction with the accompanying drawings wherein:

DESCRIPTION OF THE PREFERRED EMBODIMENT

Figure 1:
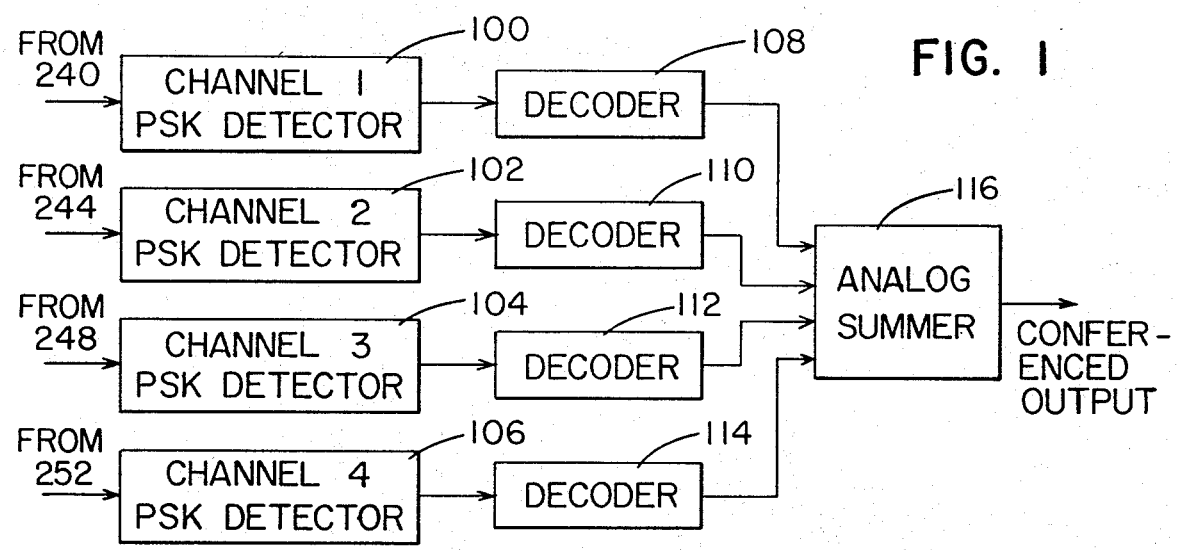
FIG. 1 is a simplified block diagram of a conferencing combiner in accordance with the present invention.

Referring now to FIG. 1, a simplified block diagram of the spread spectrum conferencing technique of the present invention is illustrated. Transmitted digitally encoded voiceband signals are received from a plurality of sources, such as from two to six vehicles, as in an aircraft squadron. The transmitted signals are received by a spread spectrum correlator described with reference to FIGS. 4 through 7, and input to the illustrated four channel receiver wherein detection is accomplished by PSK detectors 100, 102, 104 and 106 in channels one through four respectively. The output of PSK detectors 100 through 106 is a two level baseband signal which is decoded by decoders 108 through 114 associated with channels one through four respectively, into a voiceband analog waveform. Each decoder output is summed by an analog summer 116, i.e., a resistive network to provide a conferenced output for each channel user. The above simplified conferencing is achieved by means of uniquely correlated PSK signals derived in accordance with the present invention. One such unique PSK signal is AM-PSK with PSK spreading of the amplitude modulation while another is direct PSK using the spread spectrum techniques described hereinafter.

Figure 2:
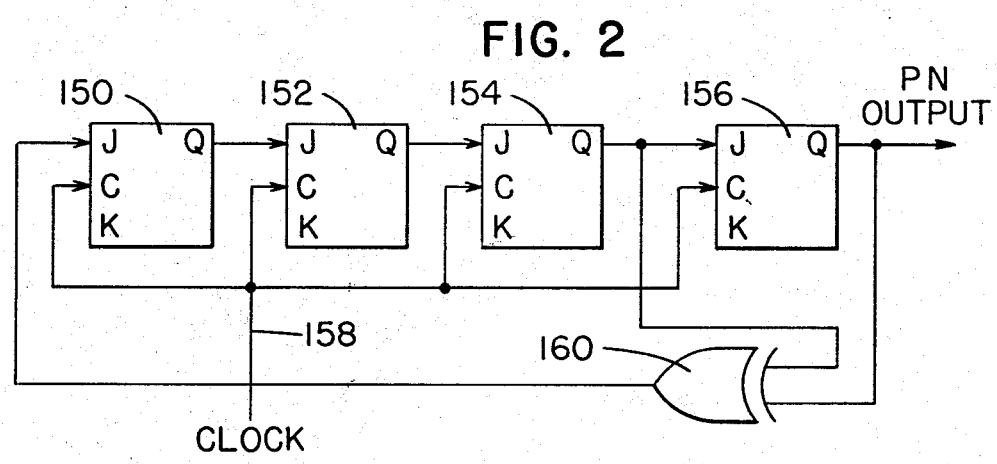
FIG. 2 is a simplified schematic of a pseudo noise generator illustrative of the generation of a PN sequence.
Figure 3:
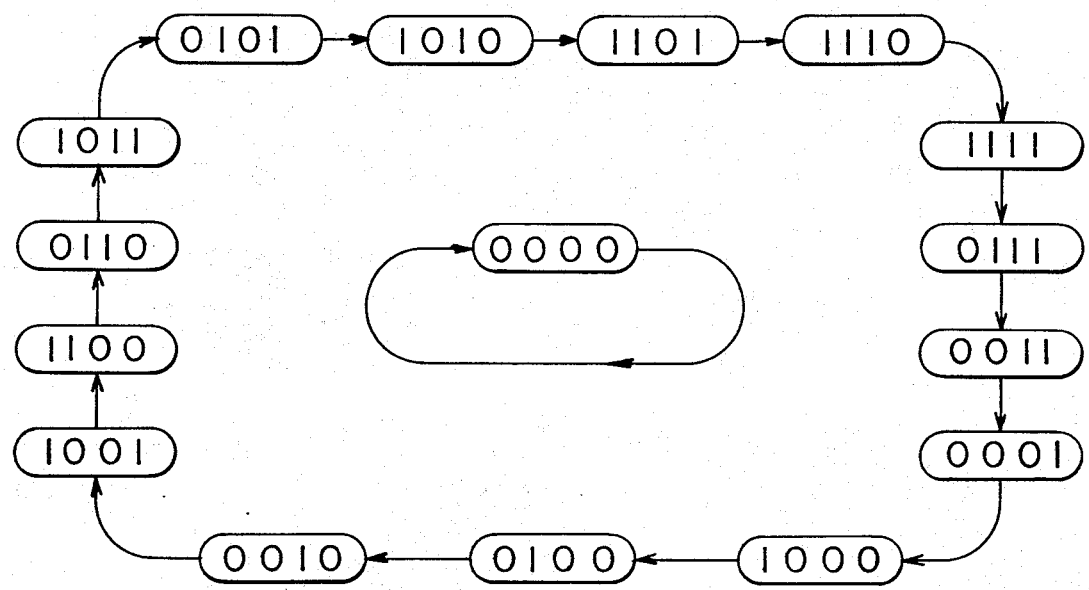
FIG. 3 is a state diagram of the PN sequence generated by the PN generator of FIG. 2.
Figure 4:
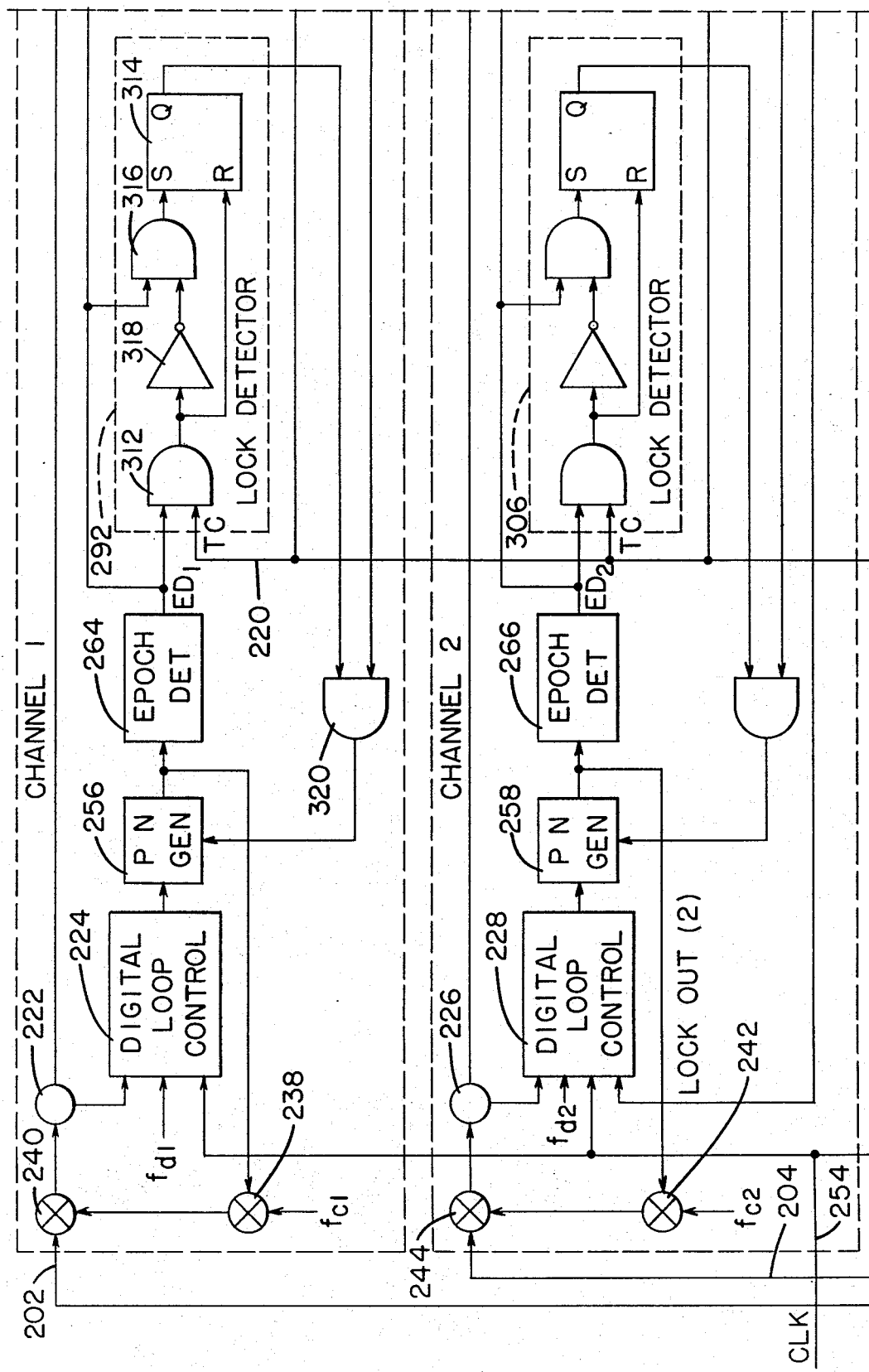
FIGS. 4, 5, 6 and 7 are a single schematic of a spread spectrum four channel conferencing system within a PSK receiver in accordance with the present invention.
Figure 5:
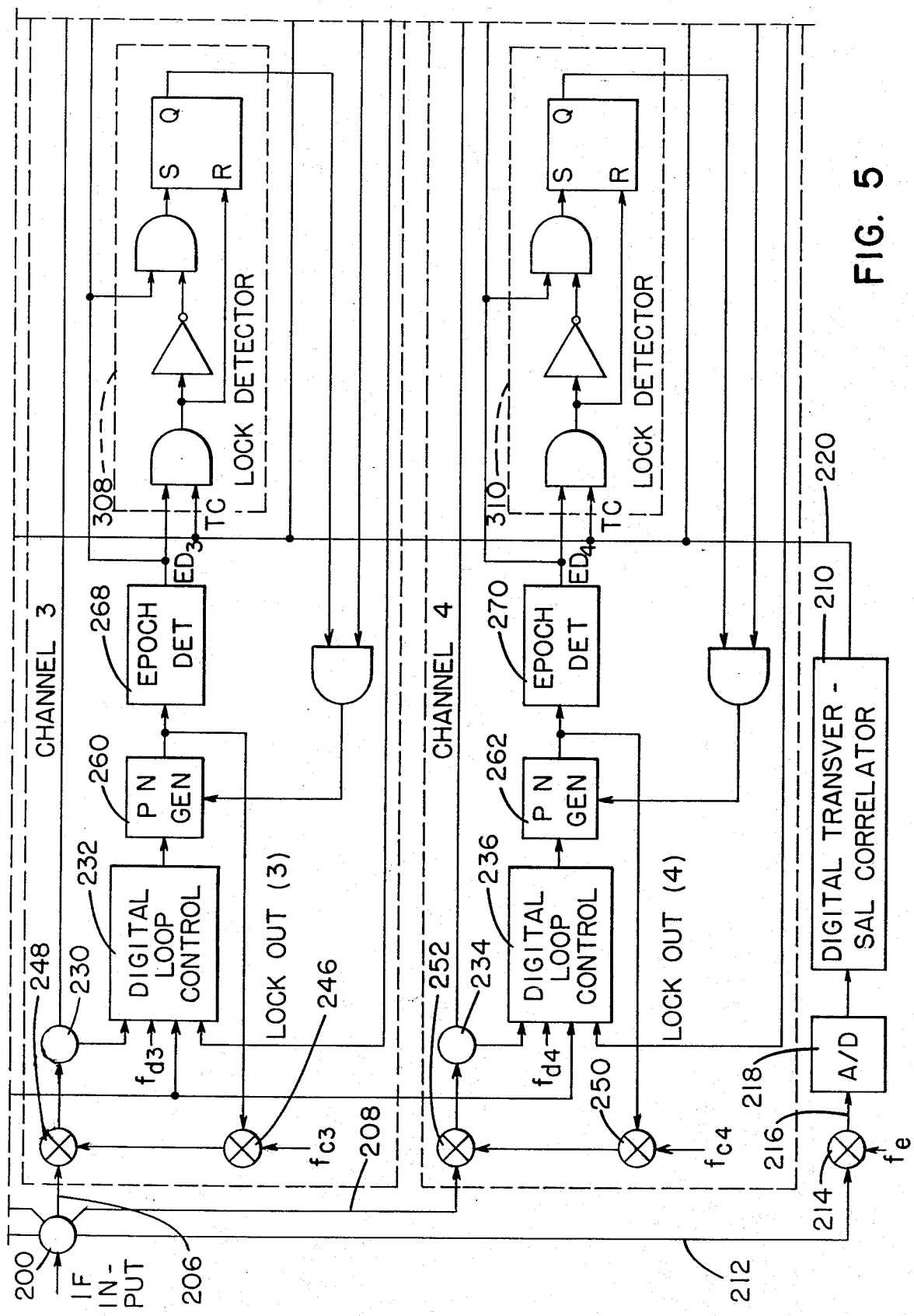
Figure 6:
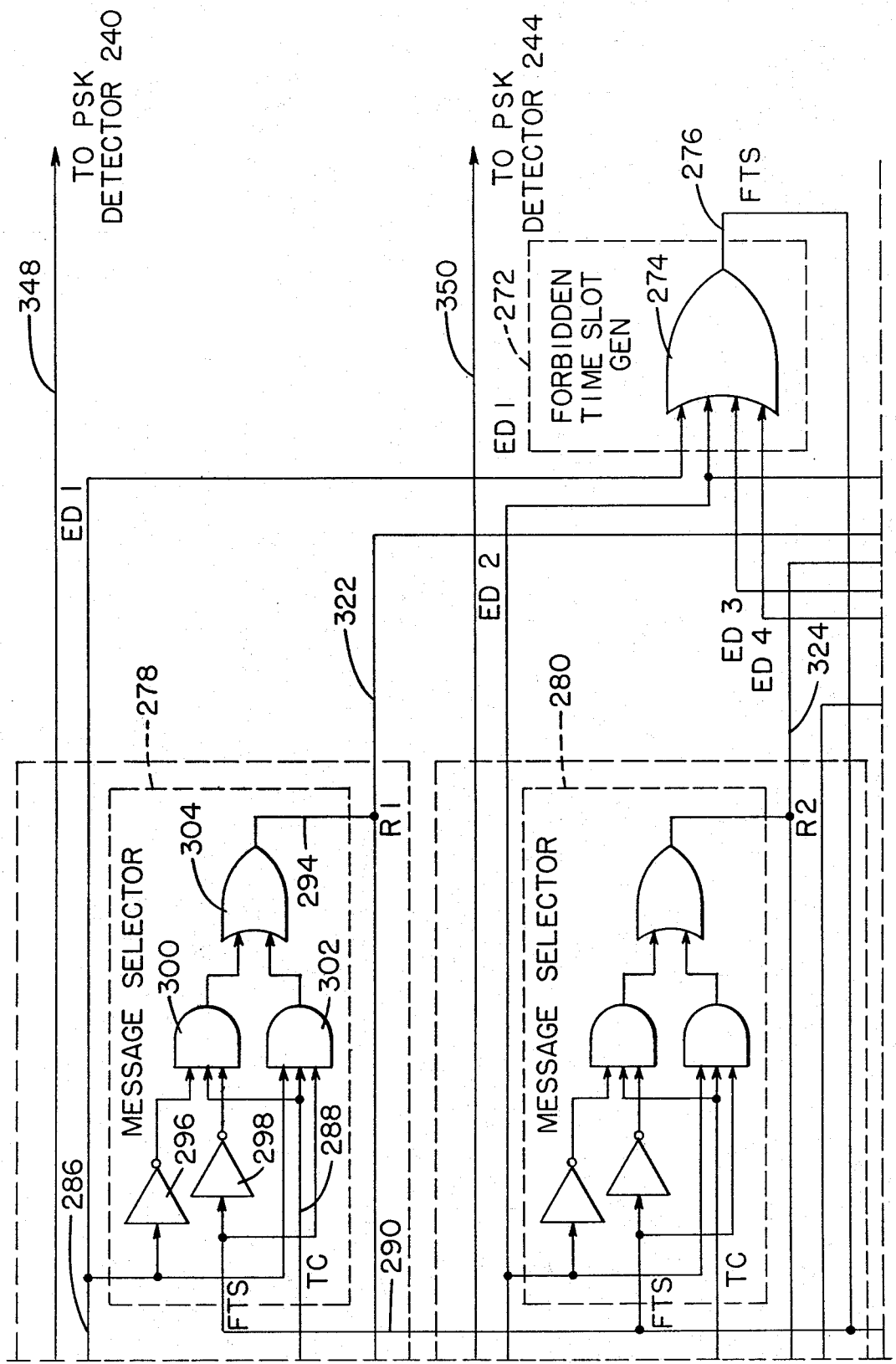
Figure 7:
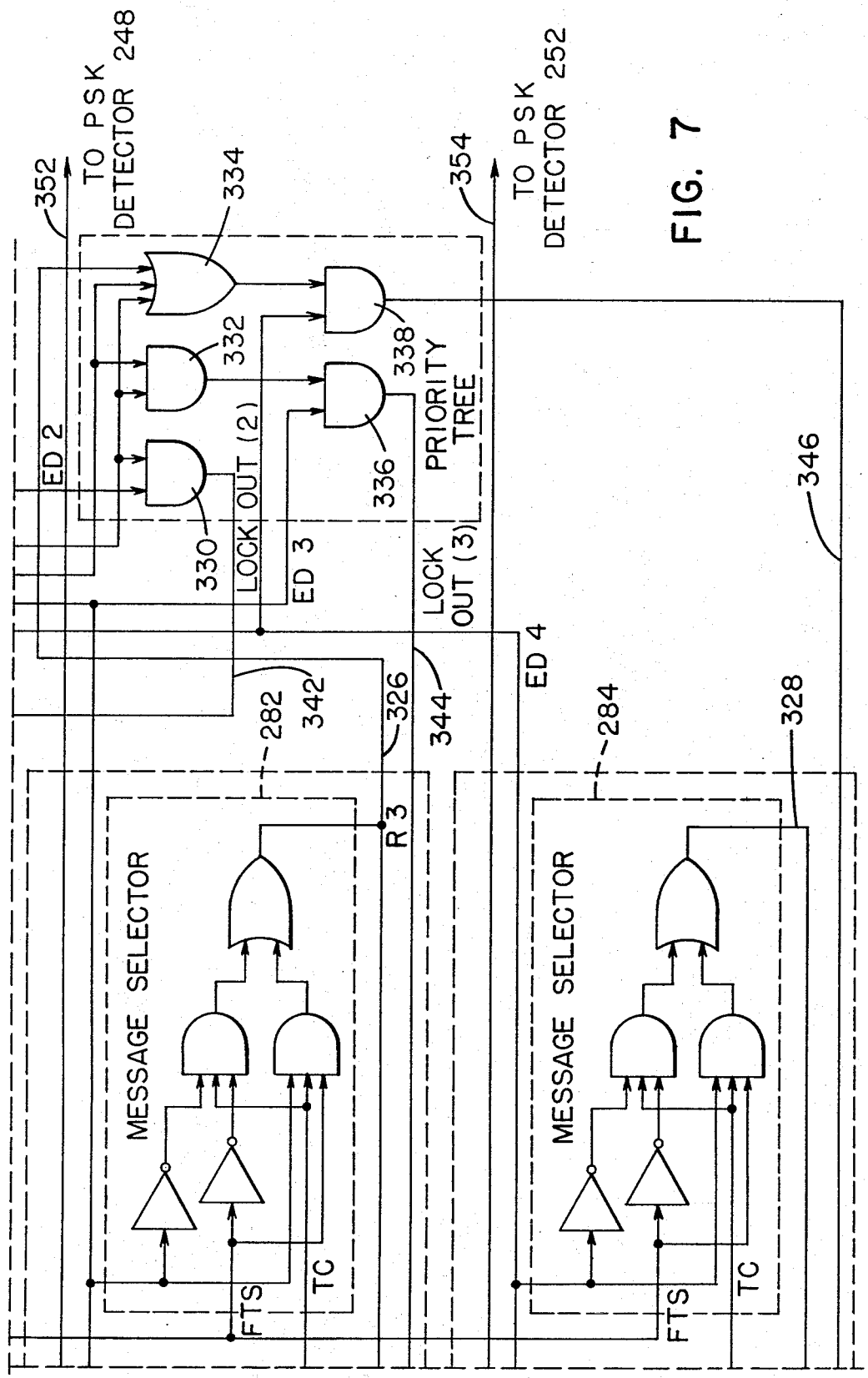

Referring now to FIGS. 2 and 3, a pseudo noise (PN) generator and state diagram therefor illustrative of the PN sequence generation utilized by the present invention is illustrated. The PN code is cyclic, having a repeat length of:

$$2^n - 1;$$

where n equals the number of stages, with each stage comprised of a single JK flip-flop. Four such flip-flops, 150, 152, 154 and 156 are illustrated by the simplified PN generator of FIG. 2, wherein:

$$n = 4;$$

hence the repeat length is 15-bits long. In actual practice, a much longer repeat length is required, in the order of several million bits, to achieve good interchannel correlation. Such multistage PN sequence generators are available, and do not in and of themselves form a portion of the present invention. One such generator is RCA-TC-045 LSI PN sequence generator. The 0000 state is a "forbidden state", in that external circuitry is added to prevent the flip-flop chain from initially setting to this state, since, as illustrated by the 0000 state diagram, the forbidden state of 0000 could not be switched to any other state, an extremely undesirable condition. The state diagram of FIG. 3 illustrates the contents of the register of FIG. 2 after each clock pulse on line 158. The illustrated register of FIG. 2 will generate a PN sequence having a frequency spectrum consisting of a plurality of lines at particular frequencies, and having an envelope in the form of:

$$\sin X/X;$$

with the first nulls occurring at the $$1/T;$$

points, where T is the duration of a clock pulse. The PN sequence lines are separated by $$1/T_s;$$

where $T_s$ is the time duration of the repeat length of the PN sequence, which for the illustrated register is:

$$T_s = 15T.$$

An exclusive OR gate 160 completes the PN sequence generation loop for the illustrated sequence, with the output coupled from flip-flop 156.

Referring now to FIGS. 4 through 7, a simplified schematic of a spread spectrum four channel conferencing receiver is illustrated. While a long non-repeating PN code may be employed, the short repeating code described heretofore will suffice. Received PSK spread spectrum messages constituting a wideband IF input spread by the PN sequence are combined at a power splitter 200 having an output coupling the received wideband IF input to channels one, two, three and four via lines 202, 204, 206 and 208, respectively, and to a digital transversal correlator 210. The received PN code on line 212 is coupled to a correlation mixer 214 at which point it is combined with a reproduced replica or estimate of the PN code, $f_e$, to derive a baseband output on line 216 of approximately 2 KHz. After analog-to-digital conversion by an analog-to-digital converter 218, the baseband signal is coupled to the digital transversal correlator 210.

Digital transversal correlator 210 serves to detect received messages rapidly, which, for a short repeating PN sequence such as the described PN sequence, would be in the order of a single data bit period for detection. Because of frequency variance in the incoming message, which may be caused by transmitter or doppler variations, a search oscillator technique may be used to generate the frequency estimate signal $f_e$. The correlator serves to recognize the instantaneous state of the PN code hereinbefore described and produces an output on line 220 consisting of a series of spikes or pulses, one such spike or pulse for each message, in a noise environment. The PN code processing gain of the correlator 210 is a function of the product of the bandwidth of the spread spectrum signal and the correlation length in time. The digital transversal correlator 210 is comprised of a pair of shift registers, with one register serving as a reference and the other receiving the PN code. Each register is compared bit-by-bit, as in a modulo-2 adder, with each register output being coupled to a summer. The summer output is the correlation peak.

The correlator 210 output pulses set the correct states of the PN generators in the respective receiver channels as will be described. Each channel has associated therewith a number of control loops. For a digital PSK system, each channel must have a PN timing feedback loop, a carrier recovery phase locked loop, and a data bit-timing phase locked loop. This loop control is provided in channel one by digital loop control 224, in channel two by digital loop control 228, in channel three by digital loop control 232 and in channel four by digital loop control 236. An autocorrelation between the PN rate and a cross correlation between the out of time PN rates for channel one is derived at correlation mixer 240 by mixing a frequency $fc_1$ (recovered from the received signal) with the generated PN sequence at mixer 238 and coupling the output of mixer 238 to mixer 240 for autocorrelation with the incoming message on line 202. Frequency $fc_1$ is the center frequency of the incoming signal. Autocorrelation functions are derived in like manner in channel two by mixing the PN sequence with $fc_2$ at mixer 242 and with the IF input at correlation mixer 244; in channel three by mixing the PN sequence with $fc_3$ at mixer 246 and with the IF input at correlation mixer 248; and in channel four by mixing the PN sequence with $fc_4$ at mixer 250 and with the IF input at correlation mixer 252. Thus, the signal on line 202 is wideband, but the signal from mixer 240 is narrowband, i.e., the PN code is removed. Stated another way, the incoming signal, spread by the PN sequence leaves correlation mixer 240 at the data rate, i.e., narrowband with phase transitions at the data rate. Mixer 240 functions as a modulo-2 adder at baseband, correlating the spread spectrum and reducing it to baseband data.

A particular digital loop control would separate the data channel from the loop control by "dithering" or misaligning the PN sequence with a locally generated clock to maximize the correlation and provide loop control by means of the correlation properties of the code. A clock on line 254 controls the dither rate while internal circuitry in each channel loop control derives individual loop error signals which, after low pass filtering, are applied to the PN generator. The local loop clocks, $fd_1$, $fd_2$, $fd_3$ and $fd_4$ for channels one through four, respectively, provide timing for the PN generators while the loop control maintains timing by either adding or deleting bits. The PN generators 256, 258, 260 and 262; each associated with a respective channel, provide sequential inputs to their respective epoch detectors; 264 for channel one, 266 for channel two, 268 for channel three and 270 for channel four.

An "epoch" is defined as a particular state of a sequence, with the "all one's" state being defined as the epoch of the PN sequence, which is the state in which a correlation is achieved by the transversal correlator. The function of the epoch generator is to generate a pulse when it detects a preprogrammed state of the PN generator. The complexity of the epoch detector is a function of the complexity of the PN code used, i.e., a short repeating code such as aforedescribed would require an epoch detector of simple configuration while a longer non-repeating sequence would require a programmable device containing the same information provided to the transversal correlator. In essence, the instant epoch detector is of similar configuration to the digital transversal correlation, having a reference register storing the PN code while another shift register receives the incoming PN sequence. When the two sequences are in alignment, a pulse is generated. Thus, a pulse is emitted when the respective channel PN generator is in the same state as the channel epoch detector. However, functionally the epoch detector differs from the transversal correlator 210 in that it operates a high signal to noise environment and detects the epoch of the PN code.

The output signal of each channel epoch detector occurs in coincidence with the received message and is used to generate two basic control signals used to perform the conference function, i.e., the correlator pulses, which are the repeated epochs and the local receiver PN generator epochs in each channel. Once an incoming message is detected by the epoch detectors, a forbidden time slot is generated in response thereto by a forbidden time slot generator 272, which in essence provides a "window" around the position of each message in accordance with the particular channel to which the message is to be assigned. The forbidden time slot generator 272 comprises an OR gate 274 having four inputs $ED_1$, $ED_2$, $ED_3$ and $ED_4$, the outputs of the respective channel epoch detectors. The output of OR gate 274 on line 276 consists of a series of timed pulses or time slots which represent points in time during which a locally generated PN sequence from a particular channel may not be present. Therefore, if a received message epoch, such as $ED_1$, occurs during one of the generated forbidden time slots, then the channel, in this case channel one, responsible for the forbidden time slot (FTS) pulse is locked to the message; however, the other channels, i.e., two through four, not responsible for the generated FTS pulse cannot reset to the message; i.e., they are "forbidden" by the multiplexing of the generated FTS pulses. The FTS pulses on line 276 are coupled to the channel message selector circuits 278 for channel one, 280 for channel two, 282 for channel three, and 284 for channel four, wherein the actual channel selection for the incoming messages is accomplished.

The channel one message selector 278 will be described, however, it is to be understood that messages selectors 280, 282 and 284 are of identical configuration. The epoch detector 264 output $ED_1$ via line 286, the transversal correlator output via line 288, and the forbidden time slot generator output via line 290 are coupled to the channel one message selector circuit 278, which circuit compares the output of a channel message lock detector 292, to be described, continuously with the message selector output on line 294 to determine whether or not a message lock or correlation, has occurred. Channel one is always given priority, i.e., is never locked out. When a lock is not indicated, PN generator 256 is preset to the epoch state of the incoming message which has been detected by the transversal correlator. If the transversal correlator line 288 is high indicating correlation detection and the FTS line 290 is low indicating a new message on the line, then the message selector 278 output line 294 will be high triggering the channel one PN correlator 256 to synchronize to the message. If the FTS line 290 had been high (logic one) indicating that the message was already being received, then the message selector output on line 294 would remain low (logic zero) unless the epoch detector 264 output $ED_1$ on line 294 was also high (logic one) indicating that channel one was in fact the channel receiving the message. Internally the message selector 278 serves to invert $ED_1$ at inverter 296 and the FTS input at inverter 298 after which inversion the inverter 296 and 298 outputs are AND'ed at AND gate 300 with the transversal correlator output pulses. AND gate 302 AND's the transversal correlator output pulses with the non-inverted $ED_1$ and FTS pulses to derive an output which is OR'ed with the output of AND gate 300 at OR gate 304 to derive the message selector 278 output. As it is possible for more than one channel to simultaneously lock to the same message, a priority sequence is required. Before describing the priority technique involved, the channel one lock detector 292 will be described. It is to be understood that channel lock detectors 306, 308 and 310 for channels two, three, and four, respectively, are configured and function in identical manner as channel one lock detector 292. Upon the detection of an incoming message, by the transversal correlator 210, which is cycled in both time and frequency, a correlation pulse is generated and emitted from the correlator via line 220 to the input AND gate 312 of lock detector 292 at which AND gate the output pulse of epoch detector 264, $ED_1$ is also applied. In the event an epoch state of channel one should be coincident with the transversal correlator pulse at AND gate 312, the channel is reenforced with another reset pulse while channels two, three, and four are inhibited by the FTS signal on line 276. Alternatively, if there were no coincident channels, then all four channels would be preset to receive the incoming message. Thus, the channel lock detector indicates a locked condition if the correlator pulse occurs simultaneously with the epoch detector pulse. Upon conclusion of the message, the epoch detector 264 will still generate a pulse, however, the transversal correlator 210 will not indicate correlation. This condition resets flip-flop 314 and indicates the logical one state, i.e., no lock. Therefore, whenever channel one is locked, a logical one appears at the outputs of the transversal correlator 210 and the epoch detector 264. Flip-flop 314 is set when AND gate 316 has coupled thereto in coincidence both $ED_1$ and the output of AND gate 312 after inverting by inverter 318. The output of flip-flop 314 is AND'ed with the output of message selector 278 at AND gate 320 to synchronize PN generator 256.

A priority sequence, or priority "tree" prevents more than one channel from remaining locked to a single message, that is, more than one channel may be initially set to the same message by the message selector; however, on the next cycle of the transversal correlator 210, the priority tree allows only one channel to remain locked and serves to offset the sequences of the other channels to a noncorrelated position. Stated another way, on the second sweep or cycle of the transversal correlator, the priority tree would allow a single channel to remain synchronized to the message while the other channels would be rendered available. This is accomplished by comparing the channel message selector outputs of the first three channels on lines 322, 324, and 326, with the epoch detector outputs of the channel epoch detector. The message selector 284 output on line 328 need not be compared since channel four always has last priority. At AND gate 330, OR gates 332 and 334 and AND gates 336 and 338 of the priority tree 340, a series of channel lockout signals are generated for temporarily inhibiting the clock driving the particular PN generator for each channel on line 342 for locking out channel two, on line 344 for locking out channel three and on line 346 for locking out channel four, which lockout signals are fed back to the respective channel digital loop control circuitry. Of course, no lockout signal is derived for channel one, since channel one always has first priority. Pursuant to the described conferencing technique, which ever channel is conferenced to couple a message to the remainder of the receiver circuitry, such message will be coupled via line 348 to the channel one PSK detector 100; via line 350 to the channel two PSK detector 102; via line 352 to the channel three PSK detector 104; and via line 354 to the channel four PSK detector 106; all of which PSK detectors operate in conventional fashion and do not form a part of the present invention.

Consideration will now be given to the receipt of a second simultaneous message by the receiver. Upon this occurrence, the transversal correlator 210 output again is coupled into message selectors 278, 280, 282 and 284 for each channel. Since epoch detector 264 output $ED_1$ is synchronized to the first message, it will be low (logic zero). Additionally, since there has as yet been no channel assignment, the FTS signal output on line 276 will also be low (logic zero). Therefore, the message selector 278 output on line 294 will be in a logical one state; however, the channel one lock detector 292 output will be at the low (logical zero) state; which serves to lock out the signal on line 294 and prevent the loss of the first message. Since the lock detector of channels two, three and four are high (logical one), being freed by the aforedescribed priority tree, channels two, three and four are preset by their respective message selectors 280, 282 and 284; after which time the priority tree will again select the second channel to detect the second message and free the third and fourth channels. In such manner, channels are assigned to specific incoming messages. In the event that a message transmission should stop, the affected channel lock detector is turned OFF at the next cycle of the transversal correlator 210 which occurs due to preprogramming of each channel epoch detector with the PN code being shifted into the transversal correlator's program register.

It is to be understood that the foregoing description of a specific embodiment of this invention is made by way of example only and is not to be considered a limitation on its scope. For example, if the modulation is AM-PSK; that is, PSK spreading of an amplitude modulated signal, then the number of loops associated with each channel are reduced to a PN timing loop which can be eliminated if sufficient processing gain can be achieved from the transversal correlator. This could be accomplished by allowing the transversal correlator signal to reset the channel PN generator on each cycle during message reception and reliance on the stability of the PN clock for timing during the reset intervals. While such an AM-PSK technique would reduce the conferencing complexity, as the output of the correlator would then comprise an AM modulated IF; only a bandpass filter, AM coherent or non-coherent detector, and an analog summer would be required.

What is claimed is:

1. A multiple subscriber random access spread spectrum conferencing communication system comprising:
means for receiving spread spectrum messages in a plurality of channels;
means for detecting said messages and for generating a first signal in each channel in response thereto;
correlation means associated with each channel for correlating said messages with a pseudonoise sequence and for generating a control signal in response thereto;
multiplexing means for assigning a particular channel to said message when said first signal and said control signal in one channel are time coincident and for locking out said other channels not having said time coincidence from said message; and
means associated with each of said channels for decoding said message.

2. A system in accordance with claim 1 wherein said multiplexing means is a time multiplexer.

3. A system in accordance with claim 1 further comprising:
priority means for assigning subsequently received messages to said other channels.

4. A system in accordance with claim 1 wherein said plurality of channels is a number greater than or equal to two and less than or equal to six.

5. A system in accordance with claim 1 wherein said spread spectrum comprises a short repeating PN code.

6. A system in accordance with claim 1 wherein said spread spectrum comprises a long non-repeating sequence.

7. A system in accordance with claim 1 wherein said means for receiving spread spectrum messages includes an IF power splitter for receiving a wideband IF input.

8. A system in accordance with claim 7 wherein said correlation means comprises a correlation mixer for removing the PN code from said wideband messages and for producing a correlated narrowband output.

9. A system in accordance with claim 1 wherein said means for detecting said messages comprises a digital transversal correlator having a processing gain proportional to the product of the bandwidth of the spread spectrum and the correlation period in time.

10. A system in accordance with claim 9 wherein said first signal is a pulse; and means for coupling said pulse to said time multiplexing means.

11. A system in accordance with claim 10 wherein said time multiplexing means comprises:

an epoch detector for detecting a particular state of said PN generator associated with said channel; and having an output when said state is coincident with a predetermined message state;

channel lock detector means for indicating the coincidence of a transversal correlator output and an epoch detector output; and a priority circuit for assigning a particular channel to said message in response to said channel lock detector indication.

12. A system in accordance with claim 9 wherein said priority circuit includes:

a message selector circuit in each channel multiplexed in time with respect to the other channel message selectors; and a forbidden time slot generator for comparing said epoch detector outputs in each channel with said message selector outputs to lock out all channels to which said message is not assigned, the assigned channel comprising the channel having an epoch detector output during its multiplexed time slot.

13. A system in accordance with claim 1 wherein said decoder is a PSK decoder.

14. A multiple channel spread spectrum receiver for conferencing incoming PN coded spread spectrum messages in a plurality of channels, each channel comprising:

correlation means for despreading said messages;

means for detecting the instantaneous state of said PN code and having an output;

parallel correlation means for detecting said messages and having an output;

means responsive to the outputs of said last two mentioned means when said outputs are coincident in time for gating said message into one channel only and inhibiting said other channels from processing said message; and means for assigning channel priority for later received messages in said inhibited channels.

15. A receiver in accordance with claim 13 further comprising:

combining means for simultaneously processing said messages from said channels at voiceband.

* * * * *